(12) United States Patent
Kawamoto et al.

(10) Patent No.: US 11,585,020 B2
(45) Date of Patent: Feb. 21, 2023

(54) NET, TETHER STORING APPARATUS, AND MANUFACTURING METHOD FOR A NET

(71) Applicants: JAPAN AEROSPACE EXPLORATION AGENCY, Tokyo (JP); NITTO SEIMO CO., LTD., Tokyo (JP)

(72) Inventors: Satomi Kawamoto, Tokyo (JP); Kentaro Iki, Tokyo (JP); Katsuya Suzuki, Tokyo (JP)

(73) Assignees: JAPAN AEROSPACE EXPLORATION AGENCY, Tokyo (JP); NTTTO SEIMO CO., LTD., Tokyo (JP)

( * ) Notice: Subject to any disclaimer, the term of this patent is extended or adjusted under 35 U.S.C. 154(b) by 323 days.

(21) Appl. No.: 16/763,451

(22) PCT Filed: Nov. 13, 2018

(86) PCT No.: PCT/JP2018/041930
§ 371 (c)(1),
(2) Date: May 12, 2020

(87) PCT Pub. No.: WO2019/093520
PCT Pub. Date: May 16, 2019

(65) Prior Publication Data
US 2020/0283934 A1  Sep. 10, 2020

(30) Foreign Application Priority Data

Nov. 13, 2017 (JP) .............................. JP2017-218064
Oct. 19, 2018 (JP) .............................. JP2018-197238

(51) Int. Cl.
*D02G 3/28* (2006.01)
*D04C 1/06* (2006.01)
(Continued)

(52) U.S. Cl.
CPC ............... *D02G 3/28* (2013.01); *B64G 1/648* (2013.01); *D04C 1/06* (2013.01); *D04C 1/08* (2013.01); *A01K 75/00* (2013.01); *B65H 75/30* (2013.01)

(58) Field of Classification Search
CPC ............... D02G 3/28; D04C 1/06; D04C 1/08
See application file for complete search history.

(56) References Cited

U.S. PATENT DOCUMENTS 1,778,284 A * 10/1930 Swanson .................. D01H 1/18
                                                    242/131.1
1,897,224 A *  2/1933 Andrews ............... A01K 75/00
                                                      D5/47
(Continued)

FOREIGN PATENT DOCUMENTS

DE  20 2014 101 193 U1   7/2015
JP       56-123438 A     9/1981
(Continued)

OTHER PUBLICATIONS

Supplementary European Search Report dated Aug. 4, 2021 in European Application No. 18876399.9.
(Continued)

*Primary Examiner* — Shaun R Hurley
(74) *Attorney, Agent, or Firm* — Saliwanchik, Lloyd & Eisenschenk (57) ABSTRACT

A tether is a net that kinks and is automatically deformed upon tension release. The tether has a length of several kilometers to several tens of kilometers upon deployment and is capable of shrinking to have a length of approximately several tens of meters to several hundreds of meters by kinking and automatically being deformed when the tension is released because of cutting or the like.

11 Claims, 7 Drawing Sheets

(51) Int. Cl.
   *D04C 1/08* (2006.01)
   *B64G 1/64* (2006.01)
   *A01K 75/00* (2006.01)
   *B65H 75/30* (2006.01)

(56) References Cited

U.S. PATENT DOCUMENTS

| | | | | |
|---|---|---|---|---|
| 1,960,462 A * | 5/1934 | Swanson | ............ | B65H 63/061 57/86 |
| 3,369,317 A * | 2/1968 | Brownell | ............ | A01K 75/00 43/7 |
| 3,507,109 A * | 4/1970 | Nakazawa | ............ | A01K 75/00 43/10 |
| 3,793,822 A * | 2/1974 | Kawai | ............ | A01K 75/00 57/244 |
| 3,866,512 A * | 2/1975 | Berger | ............ | D04C 3/30 87/8 |
| 4,466,331 A * | 8/1984 | Matheson | ............ | D07B 1/02 57/244 |
| 4,619,108 A * | 10/1986 | Hotta | ............ | D04G 1/00 57/244 |
| 4,947,727 A * | 8/1990 | Momoi | ............ | D07B 1/02 57/236 |
| 6,199,359 B1 * | 3/2001 | Hart | ............ | B65H 69/061 57/22 |
| 6,250,107 B1 * | 6/2001 | Visser | ............ | A44C 5/0069 63/11 |
| 6,260,807 B1 * | 7/2001 | Hoyt | ............ | D04C 1/08 244/158.2 |
| 6,286,788 B1 * | 9/2001 | Hoyt | ............ | B64G 1/648 244/158.2 |
| 6,290,186 B1 * | 9/2001 | Hoyt | ............ | D04C 3/30 244/158.2 |
| 6,386,484 B1 * | 5/2002 | Hoyt | ............ | D04C 1/08 244/158.2 |
| 6,431,497 B1 | 8/2002 | Hoyt et al. | | |
| 7,178,763 B2 * | 2/2007 | Licata | ............ | B64G 1/222 244/167 |
| 2006/0060716 A1 | 3/2006 | Licata | | |
| 2006/0201129 A1 * | 9/2006 | Bumgardner | ............ | D02G 3/328 57/225 |
| 2018/0220558 A1 * | 8/2018 | Simoens | ............ | H05K 9/0098 |

FOREIGN PATENT DOCUMENTS

| | | |
|---|---|---|
| JP | 61-199738 A | 9/1986 |
| JP | 62-104951 A | 5/1987 |
| JP | 2-48208 B2 | 10/1990 |
| JP | 2007-131124 A | 5/2007 |
| WO | WO-2005/090162 A1 | 9/2005 |
| WO | WO-2018154603 A1 * | 8/2018 ............ B64G 1/244 |

OTHER PUBLICATIONS

International Search Report in International Application No. PCT/JP2018/041930, filed Nov. 13, 2018.

* cited by examiner

NET, TETHER STORING APPARATUS, AND MANUFACTURING METHOD FOR A NET

CROSS-REFERENCE TO RELATED APPLICATIONS

This application is the U.S. national stage application of International Patent Application No. PCT/JP2018/041930, filed Nov. 13, 2018, which claims the benefit under 35 U.S.C. § 119 of Japanese Application Nos. 2017-218064, filed Nov. 13, 2017; and 2018-197238, filed Oct. 19, 2018; the disclosures of each of which are incorporated herein by reference in their entirety.

TECHNICAL FIELD

The present invention relates to a net used as a space tether used for removing debris in the outer space for example, a tether storing apparatus, and a manufacturing method for a net.

BACKGROUND ART

An electrodynamic tether, a momentum transfer tether, and the like have been proposed, and a tether having a length of several hundreds of meters to several tens of kilometers has been demonstrated in the outer space.

A tether in a wound state is launched into the outer space, and deployed by for example releasing an end-mass attached to one end of the tether with a spring or the like at several meters per second (see Non-Patent Literature 1).

The inventors of the present invention have proposed a space tether having light weight, a reduced occupation area, and high strength (see Patent Literature 1).

CITATION LIST

Patent Literature

Patent Literature 1: Japanese Patent Application Laid-open No. 2007-131124

Non-Patent Literature

Non-Patent Literature 1: http://www.kenkai.jaxa.jp/research/debris/deb-edt.html

DISCLOSURE OF INVENTION

Technical Problem

There is for example a case where a tether is cut or a malfunction occurs in a spacecraft which operates a tether and is located at an end of the tether and the propulsion force and collision avoidance capability of the tethered satellite are lost. In this case, the tether in a deployment state orbits in the outer space for a long period, which adds the burden for avoiding collision to operating satellites and the like and increases the collision risk.

In view of the above-mentioned circumstances, it is an object of the present invention to provide a technology that inhibits the burden for avoiding collision from adding to operating satellites and the like and also inhibits the collision risk from increasing even if a tether orbits in the outer space for a long period.

It is another object of the present invention to provide a technology that can be used for a fishing net having net meshes that automatically extend, an electric wire that does not interfere with others when the electric wire is cut, and the like.

Solution to Problem

In order to accomplish the above-mentioned object, a net according to an embodiment of the present invention kinks and is automatically deformed upon tension release.

In the present invention, typically, when the net as the tether in a deployment state with tension in the outer space is cut, the tension is released and the net is automatically deformed from the deployment state for example. Therefore, even if the net as the tether orbits in the outer space for a long period, less burden for avoiding collision is added to operating satellites and the like and the collision risk added thereto lowers.

The net according to the embodiment of the present invention is formed by configuring
a plurality of cabled yarns in a net form, the plurality of cabled yarns including a first cabled yarn and a second cabled yarn, the first cabled yarn obtained by finally twisting a plurality of first strands with an S-twist, the plurality of first strands each being a first strand obtained by first twisting a first single yarn and a second single yarn having higher torsional rigidity than the first single yarn with a Z-twist, the second cabled yarn being obtained by finally twisting a plurality of second strands with an S-twist, the plurality of second strands each being a second strand obtained by first twisting the first single yarn and the second single yarn with an S-twist.

The net according to the embodiment of the present invention is configured by crossing the plurality of cabled yarns in a zigzag form to be knotless such that the first cabled yarn and the second cabled yarn are alternately adjacent to each other.

In the net according to the embodiment of the present invention, the second single yarn includes a piano wire, a tungsten wire, or a high strength fiber.

Since the net according to the embodiment of the present invention includes the second strand formed of such a material, the net is enabled to be automatically deformed from the deployment state upon tension release, to increase the force of deformation, and to increase the strength of the net itself.

The net according to the embodiment of the present invention is formed by first twisting a plurality of single yarns into a first strand, finally twisting a plurality of first strands each being the first strand into a cabled yarn, and configuring a plurality of cabled yarns each being the cabled yarn in a net form, in which balance between the number of twists per length unit in the first twist and the number of twists per length unit in the final twist is adjusted such that the net is automatically deformed upon tension release. With this configuration, the net that is automatically deformed from the deployment state upon tension release can be configured without using a special material.

The net according to the embodiment of the present invention is used as a space tether.

The space tether that is the net according to the embodiment of the present invention is electrically conductive. With this configuration, current flows through the tether, induced electromotive force can be generated, and it functions as an electrodynamic tether system. A bare tether (with no insulation) having an electrically conductive site not covered but exposed may be provided. With this configuration, the tether itself can correct surrounding electrons. Moreover, by configuring the tether in the net form, the tether is enabled to collect more electrons and the tether performance can be enhanced.

The net according to the embodiment of the present invention is used as a fishing net.

The net according to the embodiment of the present invention is used as an electric wire or added to an electric wire as an auxiliary member.

A tether storing apparatus according to the embodiment of the present invention includes: a first winder portion that winds and stores a net lightly twisted upon tension release in accordance with a spool method of deployment from an inside, has one side from which one end of the net extends and another side from which another end of the net extends, and is capable of deploying the net to an outside from the one side; and a second winder portion that is continuous with the other end of the net stored by the first winder portion and winds and stores a net tightly twisted upon tension release in accordance with a spool method of deployment from an outside.

In the tether storing apparatus according to the embodiment of the present invention, the lightly twisted net is a net that is not automatically deformed upon tension release and the tightly twisted net is a net that is automatically deformed upon tension release.

With this configuration, the tether can smoothly be deployed in a case where this tether storing apparatus is used in the outer space.

A manufacturing method for a net according to an embodiment of the present invention includes: first twisting a first single yarn and a second single yarn having higher torsional rigidity than the first single yarn into a first strand with a Z-twist; finally twisting a plurality of first strands into a first cabled yarn with an S-twist, the plurality of first strands each being the first single yarn; first twisting the first single yarn and the second single yarn into a second strand with an S-twist; finally twisting a plurality of second strands into a second cabled yarn with an S-twist, the plurality of second strands each being the second strand; configuring the plurality of cabled yarns including the first cabled yarn and the second cabled yarn in a net form to be knotless; and adjusting at least a thickness of the second single yarn or balance between the number of twists per length unit in the final twist for the first or second cabled yarn and the number of twists per length unit in the first twist for the first strand such that the net is automatically deformed into a desired state upon tension release.

With this configuration, the net that is automatically deformed into the desired state upon tension release can be manufactured.

Advantageous Effects of Invention

In accordance with the present invention, even if a tether orbits in the outer space for a long period, less burden for avoiding collision is added to operating satellites and the like and the collision risk is not added.

In accordance with the present invention, a fishing net that automatically widens the net meshes, an electric wire that does not interfere with others in case of cutting of the electric wire itself, and the like can be provided.

MODE(S) FOR CARRYING OUT THE INVENTION

Hereinafter, embodiments of the present invention will be described with reference to the drawings.

<Debris Removing System>

Figure 1:
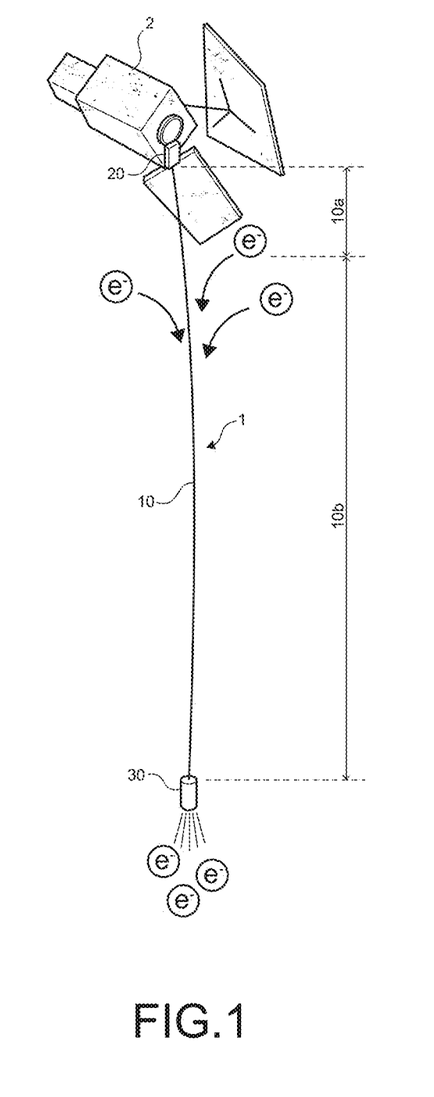
FIG. 1 A diagram showing a configuration of a debris removing system according to a first embodiment of the present invention.

FIG. 1 is a diagram showing a configuration of a debris removing system according to an embodiment of the present invention.

A debris removing system 1 includes a tether 10 as a net, a spacecraft 20 on which a tether storing apparatus that stores the tether 10 is mounted, and an end-mass 30 attached to one end of the tether 10. An electron emitter is provided on the side of the end-mass 30. The electron emitter has been described in Non-Patent Literature 1 for example. FIG. 1 shows a state in which the spacecraft 20 is attached to debris 2.

Typically, the tether 10 has a length of several kilometers to several tens of kilometers upon deployment and is capable of shrinking to have a length of approximately several tens of meters to several hundreds of meters by kinking and automatically being deformed when the tension is released because of cutting or the like. A part 10a of the tether 10, which is within about 100 m from the one end, is a portion that is lightly twisted and is not to be automatically deformed or substantially not to be deformed upon tension release. The other part 10b is a portion that is tightly twisted and is to be automatically deformed upon tension release. It should be noted that the part 10a and the part 10b are continuous with each other, and those may be integrated during manufacture or those may be connected and integrated to each other.

<Tether According to First Embodiment>
<Configuration of Tether>

FIGS. 2A to 2E are diagrams for describing a configuration of the tether 10.

Single yarn

Figure 2A:
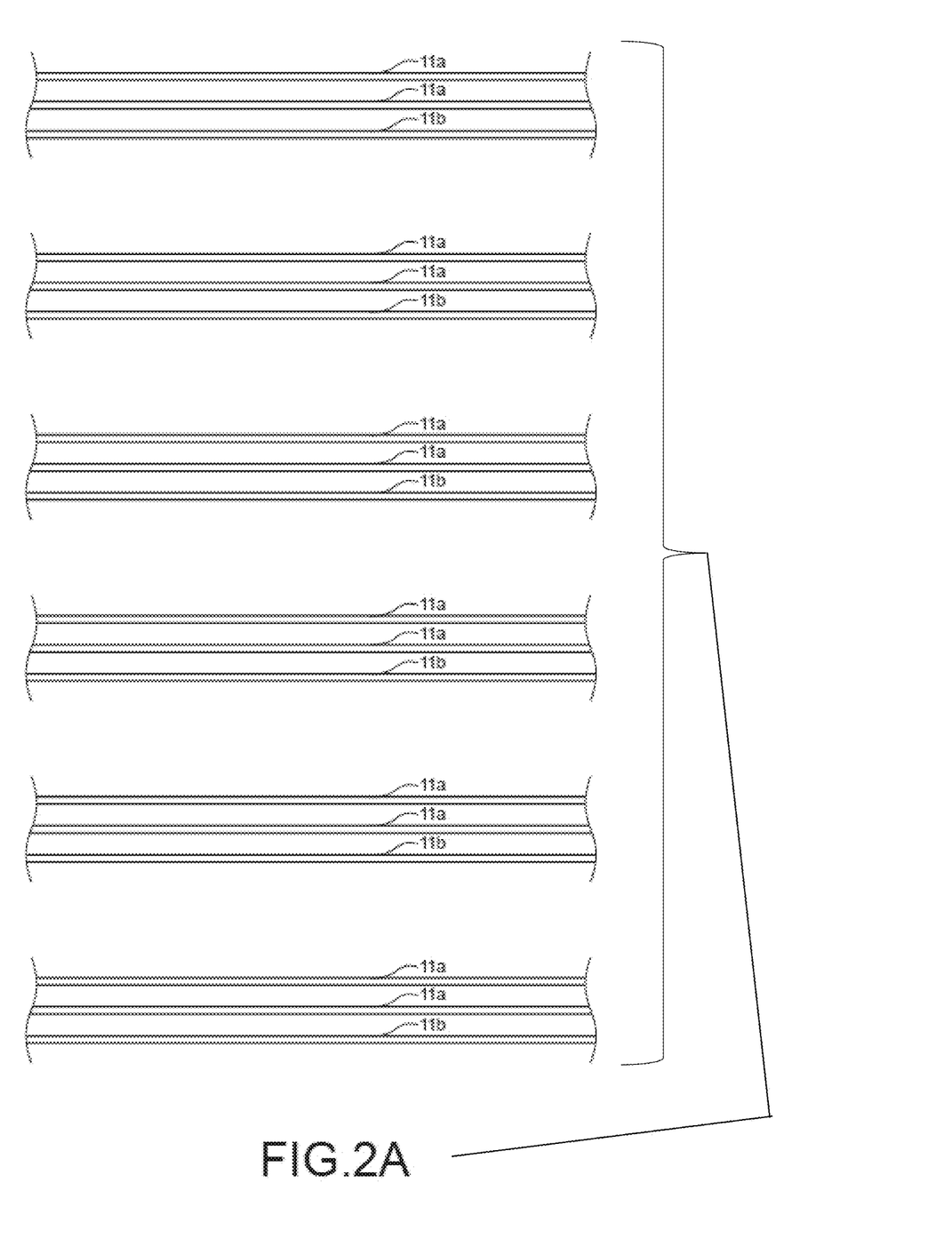
FIG. 2A A diagram for describing single yarns that constitute a tether shown in FIG. 1.

As shown in FIG. 2A, the tether 10 is constituted by 18 single yarns 11a and 11b. Out of them, 12 single yarns 11a are formed of aluminum wires and the other 6 single yarns 11b are formed of stainless fibers. The single yarns 11a that are aluminum wires each have a diameter of about 0.15 mm for example and the single yarns 11b that are the stainless fibers each have a diameter of about 0.1 mm for example. Since the tether 10 includes the single yarns 11a that are aluminum wires, the tether 10 is favorably electrically conductive. Moreover, at least the single yarns 11a that are aluminum wires are not covered but exposed. Moreover, both end portions of the tether 10, which have a length of about 10 m for example, are constituted by 12 single yarns 11*a* that are aluminum wires and 18 single yarns 11*b* that are stainless fibers as reinforced portions. It should be noted that the number of yarns, the materials, thickness, and the like described above are only exemplary and various aspects can be employed in the present invention.

Strand

Figure 2B:
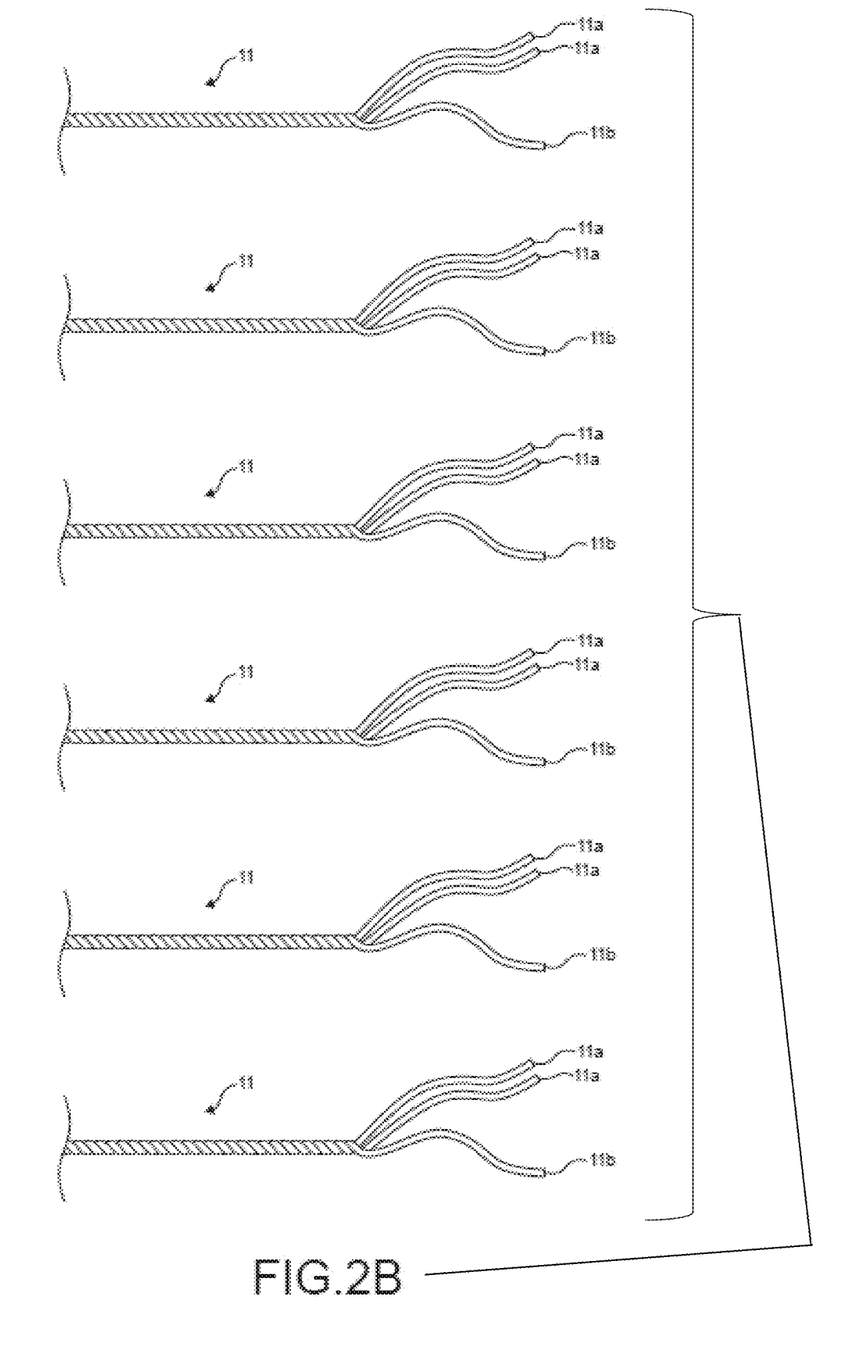
FIG. 2B A diagram for describing strands that constitute the tether shown in FIG. 1.

As shown in FIG. 2B, combinations of single yarns 11*a* that are two aluminum wires and a single yarn 11*b* that is one stainless fiber are each first twisted such that six strands 11 are configured. It should be noted that at the above-mentioned reinforced portions, each strand 11 is constituted by single yarns 11*a* that are two aluminum wires and single yarns 11*b* that are three stainless fibers.

Cabled-yarn/tether

Figure 2C:
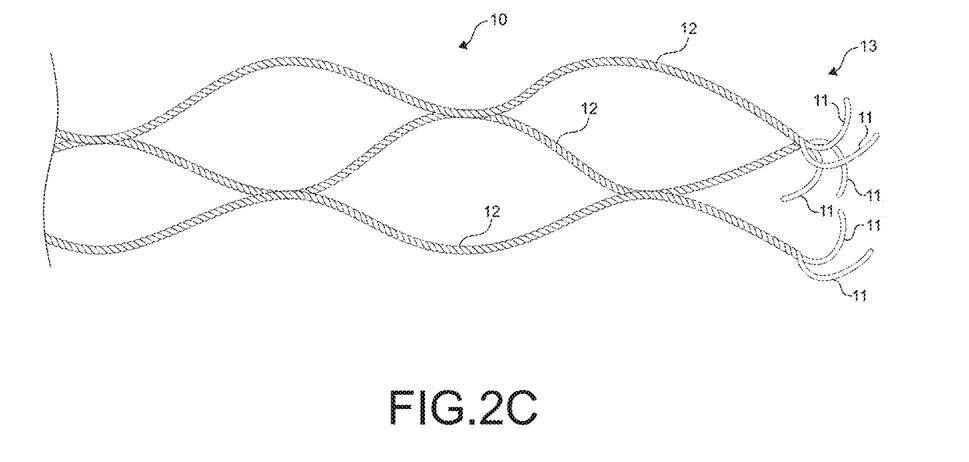
FIG. 2C A diagram for describing cabled yarns that constitute the tether shown in FIG. 1.

As shown in FIG. 2C, pairs of strands 11 are each finally twisted such that three cabled yarns 12 are configured, and the three cabled yarns 12 are knotted to form a net form 13 such that one tether 10 is configured. That is, the tether 10 is a linear body in the net form that has a length of several kilometers to several tens of kilometers and a width of several millimeters upon deployment. It should be noted that although portions of the tether 10 are not twisted for the sake of easy understanding of the configuration of the tether 10 in FIGS. 2B and 2C, those portions are actually also twisted and configured in the net form.

Figure 3:
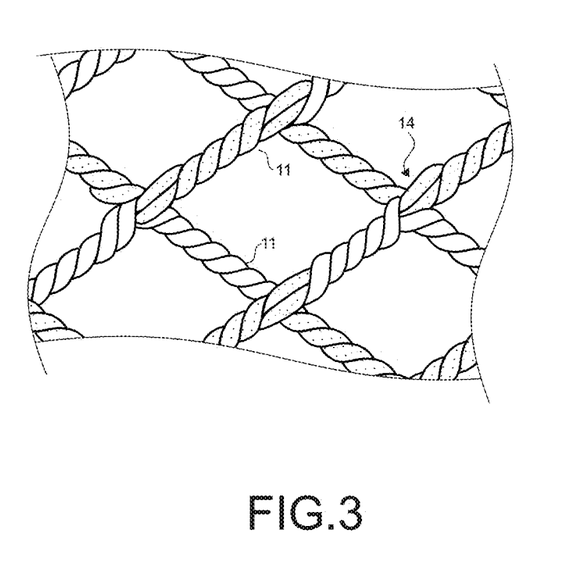
FIG. 3 An enlarged diagram a part of the tether shown in FIG. 2C.

FIG. 3 is an enlarged diagram of the tether 10. The tether 10 forms a net form by knotting respective adjacent ones of the three cabled yarns 12 together at predetermined intervals or random intervals. Those knotted portions will be referred to as cross portions 14. Crossing of the respective cross portions 14 is typically in a zigzag form so as to provide a net structure. This net structure can achieve weight reduction and inhibit it from being bulky during storage.

Deformation upon tension release

The tether 10 can be configured to be automatically deformed upon tension release by adjusting balance between the number of twists per length unit in first twisting the single yarns 11*a* and 11*b* shown in FIG. 2B into the strand 11 and the number of twists per length unit in finally twisting the strands 11 shown in FIG. 2C into the cabled yarn 12. Moreover, the tether 10 can be configured not to be deformed or substantially not to be deformed by lightly twisting the tether 10 in such a manner. Moreover, the tether 10 can be configured not to be deformed or substantially not to be deformed upon tension release by adjusting the balance between the number of twists per length unit in the first twist and the number of twists per length unit in the final twist.

In this embodiment, the tether 10 is lightly twisted in the part 10*a* within about 100 m from the one end of the tether 10, such that the part 10*a* is configured not to be deformed or substantially not to be deformed upon tension release. The balance between the number of twists per length unit in the first twist and the number of twists per length unit in the final twist is adjusted in the other part 10*b*, such that the other part 10*b* is deformed upon tension release.

<Tether Storing Apparatus>

Figure 4:
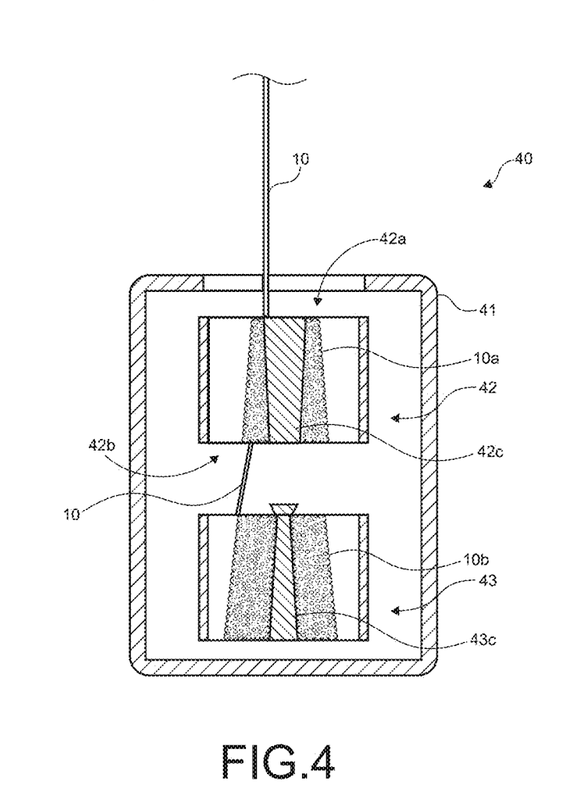
FIG. 4 A diagram showing a configuration of a tether storing apparatus according to the first embodiment of the present invention.

FIG. 4 is a diagram showing a configuration of the tether storing apparatus according to the embodiment of the present invention.

A tether storing apparatus 40 typically stores the tether 10 shown in FIG. 1 and includes two winder portions 42 and 43 inside a casing 41.

The first winder portion 42 winds and stores the part 10*a* of the tether 10, which ranges within about 100 m from its one end. The second winder portion 43 winds and stores the other part 10*b* of the tether 10.

The first winder portion 42 winds and stores the tether 10 in accordance with a spool method of deployment from the inside, the one end of the tether 10 extends from one side 42*a*, the other end of the tether 10 extends from another side 42*b*, and the tether 10 can be deployed to the outside from the one side 42*a*. The end-mass 30 is attached to the one end of the tether 10. Typically in the spool method of deployment from the inside, the tether 10 is wound and stored around a stationary spool-type reel 42*c*, which is fixed to the casing 41 and does not rotate, and the tether 10 is deployed from the inside in an axis direction of the reel 42*c* without rotation of the reel 42*c*. That is, the tether 10 is deployed in such a manner that the tether 10 unwind outward from the outer circumference of the reel 42*c* and the tether 10 also unwind in the axis direction of the reel 42*c*.

The second winder portion 43 is continuous with the other end of the tether 10 stored on the first winder portion 42 and winds and stores the tether 10 in accordance with a spool method of deployment from the outside. Typically, in the spool method of deployment from the outside, the tether 10 is wound and stored around a stationary spool-type reel 43*c*, which is fixed to the casing 41 and does not rotate, and the tether 10 is deployed to the outside in an axis direction of the reel 43*c* without rotation of the reel 43*c*. That is, the tether 10 is deployed in such a manner that the tether 10 unwind inward from the outer circumference of the tether 10 wound around the reel 43*c* and also unwind in the axis direction of the reel 43*c*.

The spool method of deployment from the inside has lower friction resistance (deployment friction) upon deployment of the tether 10 than the spool method of deployment from the outside.

It should be noted that although the first and second winder portions 42 and 43 are arranged in series in this example, those may be arranged in parallel. Moreover, two or more pairs of the first and second winder portions 42 and 43 may be provided.

This tether storing apparatus 40 is mounted on the spacecraft 20.

When the spacecraft 20 has been fixed to debris, the end-mass 30 mounted on the spacecraft 20 is launched with force of a spring or the like downward (on the earth side) at approximately several tens of centimeters to several meters per second. The tether 10 is pulled out of the tether storing apparatus 40 and deployed downward.

In the tether storing apparatus 40, the tether 10 wound around the first winder portion 42 is first pulled out when the tether 10 is deployed.

In the first winder portion 42, the lightly twisted tether 10 is deployed from the reel 42*c* using the spool method of deployment from the inside with lower deployment friction. Accordingly, the tether 10 can be deployed at high speed without applying excessive high tension.

When the deployment distance reaches a certain distance, for example, about 100 m thereafter, the gravity gradient increases. Then, the tether 10 wound around the second winder portion 43 is pulled out and the tether 10 is deployed.

In the second winder portion 43, the tightly twisted tether 10 is deployed from the reel 43*c* using the spool method of deployment from the outside while braking with higher deployment friction. Accordingly, the tether 10 can be deployed not at excessive high speed without applying excessive high tension.

Therefore, the tether 10 can be smoothly deployed through the tether storing apparatus 40 according to the present embodiment.

It should be noted that when storing the tether 10 in this tether storing apparatus 40, the tether 10 may be twisted such that the tether 10 kinks and is automatically deformed upon tension release.

<Actions and Effects>

In this manner, the tether 10 is deployed with the tension applied between debris and the end-mass 30 in the outer space. Then, electrons (e" as depicted in FIG. 1) are emitted from the electron emitter such that current flows through the tether 10. Lorentz force acts on the tether 10. As a result, the debris lowers with the debris removing system 1 and enters the atmosphere and disappears.

If the tether 10 is cut with some cause or the tether is automatically detached after elapse of a certain time in case of some failure of the spacecraft 20 before the debris enters the atmosphere and disappears, the gravity gradient is cancelled and the tension of the tether 10 is released. Then, the tether 10 is automatically deformed to be compact from the deployment state.

Since the tether 10 is deformed to be compact in this manner, the tether 10 with the length of several kilometers to several tens of kilometers does not remain in the outer space, and the burden on operating satellites can be alleviated.

That is, even if the tether 10 remains in orbit in the outer space for a long period, its length is extremely short, less burden for avoiding collision is added to operating satellites and the like and the collision risk lowers.

<Others>

The present invention is not limited to the above-mentioned embodiment, and can be implemented within the scope of its technological idea and the scope of implementation also falls within the scope of the present invention.

For example, in the tether according to the present invention, at least one of the plurality of cabled yarns may be constituted by a material such that at least one single yarn is automatically deformed upon tension release. Although the strands 11 that constitute the tether 10 are constituted by the single yarns 11a that are aluminum wires and the single yarns 11b that are stainless fibers in the above-mentioned embodiment for example, it is sufficient that a single yarn constituted by a material that is automatically deformed upon tension release is added to it over its entire or partial region. A material having high strength or high torsional rigidity such as a high strength fiber represented by a monofilament fiber and piano wires is favorably used as the material that is automatically deformed upon tension release. It should be noted that the present invention is not limited to those materials, and other materials such as a tungsten wire may be used. The use of those materials enables the tether to be automatically deformed from the deployment state upon tension release and can increase the strength of the tether itself. In the present invention, for example by changing the twist balance set when the tether is manufactured or inserting the above-mentioned high strength fiber or the like into a part of the tether to thereby add a light twist, deformation, or the like to the tether, the tether is deformed to be compact if the tether is cut and the gravity gradient is cancelled, the tether with the length of several kilometers to several tens of kilometers does not remain in the outer space, and the burden on operating satellites can be alleviated.

Although the tether is constituted by the aluminum wires and stainless fibers in the above-mentioned embodiment, other materials may be used. The use of electrically conductive aramid fibers instead of the stainless fibers for example can reduce the weight while maintaining the strength and the electrical conductivity.

Moreover, the deployment friction can be reduced while inhibiting vacuum adhesion by burning a $MoS_2$ electrically conductive film for example on the surface of the tether according to the present invention.

Moreover, the tether according to the present invention can be used for debris removal and the like even if the tether is not electrically conductive.

Moreover, the tether according to the present invention can be used for various purposes other than the purpose of debris removal in the outer space.

Moreover, the tether storing apparatus according to the present invention may store a tether other than the tether according to the present invention.

<Tether According to Second Embodiment>

Figure 5:
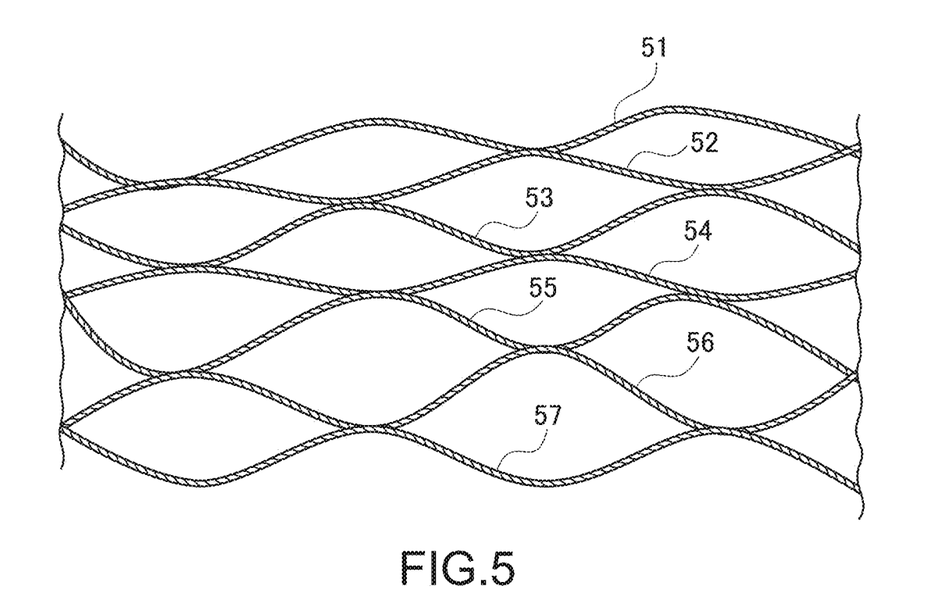
FIG. 5 An enlarged diagram of a part of a tether according to a second embodiment of the present invention.

FIG. 5 is a diagram for describing a configuration of a tether 50 according to a second embodiment.

As shown in FIG. 5, the tether 50 as a net includes first to seventh cabled yarns 51 to 57 and is configured in the net form by crossing the first to seventh cabled yarns 51 to 57 to be knotless in a zigzag form (see FIG. 3) for example at intervals of about 30 cm. With the knotless net configuration, it is not bulky with no knots and lowering of the strength, which would occur at knots, is inhibited. Moreover, the zigzag form inhibits deviation on the net meshes. It should be noted that in the present invention, a penetration type may be employed as a matter of course.

Figure 6:
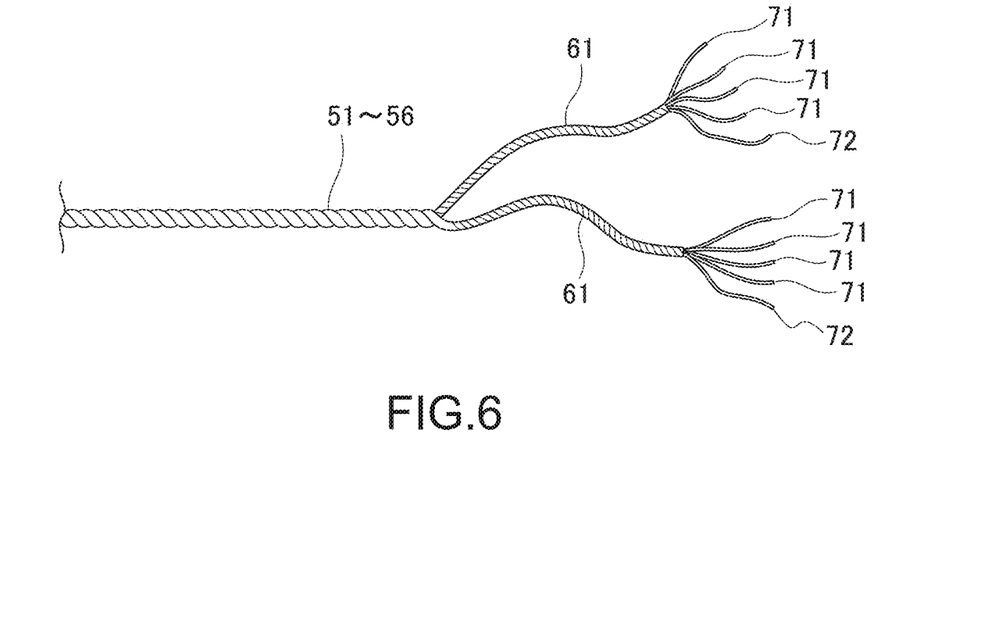
FIG. 6 A diagram for describing cabled yarns that constitute the tether shown in FIG. 5.

The first to seventh cabled yarns 51 to 57 are each formed by finally twisting two strands 61 as shown in FIG. 6.

Figure 7:
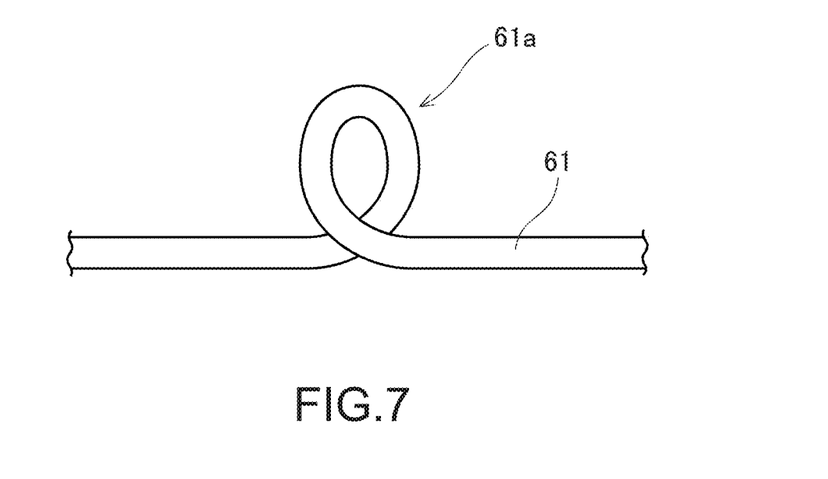
FIG. 7 A diagram showing a kink of a wire.

Strands 61 of the first to sixth cabled yarns 51 to 56 of the first to seventh cabled yarns 51 to 57 are formed by first twisting four aluminum wires 71 and one electrically conductive aramid fibers 71, which are first single yarns, and one piano wire 72, which is a second single yarn. The thickness of the aluminum wire 71 is for example Φ 0.15 mm and the thickness of the piano wire 72 is for example Φ0.05 mm. Moreover, the piano wire 72 as the second single yarn has higher torsional rigidity than the aluminum wire 71 as the first single yarn. By mixing and twisting the material having higher torsional rigidity, the strand 61 itself is configured to kink as indicated by the reference sign 61a as shown in FIG. 7, and automatic deformation can be achieved.

It should be noted that in the present invention, the thickness of each of the aluminum wires 71 and the piano wire 72 is not limited to this example. Moreover, the number of strands is also not limited to this example.

A strand (not shown) of the seventh cabled yarn 57 is formed by first twisting four aluminum wires and electrically conductive aramid (not shown).

The first, third, and fifth cabled yarns 51, 53, and 55 are formed by first twisting the strands 61 from the aluminum wires 71 and the piano wire 72 with a Z-twist and finally twisting the two strands 61 with an S-twist.

The second, fourth, and sixth cabled yarns 52, 54, and 56 are formed by first twisting the strands 61 from the aluminum wires 71 and the piano wire 72 with an S-twist and finally twisting the strands 61 with an S-twist.

Figure 8A:
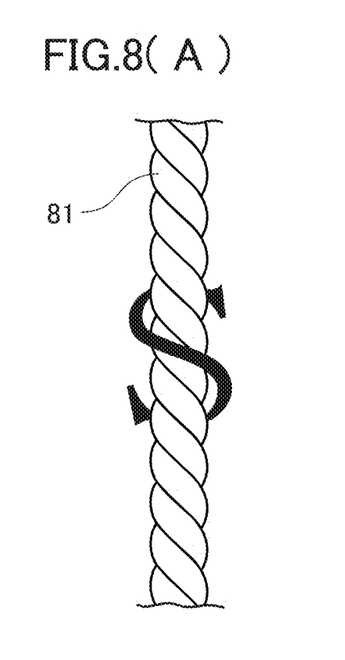
FIG. 8A A diagram showing an S-twist and Z twist.
Figure 8B:
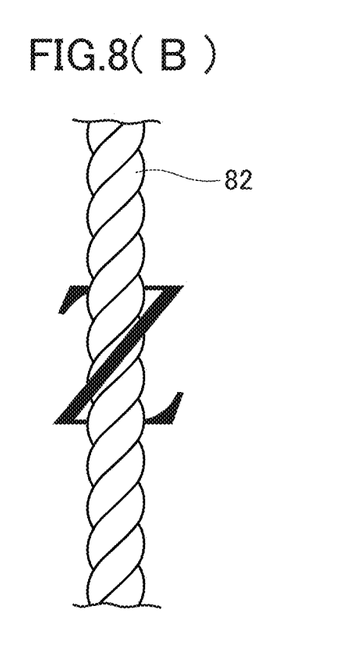
FIG. 8B A diagram showing a Z-twist.

The S-twist means a twist in which a twist direction of the yarn 81 is right as shown in FIG. 8(A). The Z-twist means a twist in which a twist direction of a yarn 82 is left as shown in FIG. 8(B).

In the tether 50 according to this embodiment, by mixing the S-twist and the Z-twist as described above, the kink balance between the cabled yarns is lost, and automatic deformation can be strongly induced.

The tether 10 according to the first embodiment is the linear body in the net form which has the width of several millimeters. That is, it can be said that the tether 10 according to the first embodiment is a net but it is like a cord. On the other hand, the tether 50 according to the second embodiment has a net form having a width of 10 cm to 100 cm, typically, about 30 cm. The tether 50 is constituted by the aluminum wires 71 and the piano wire 72, is electrically conductive, and has the net form to increase the part. With this configuration, the tether 50 itself is capable of collecting surrounding electrons and the tether performance can be enhanced. Moreover, since the tether 50 has the net form to have a certain width, the probability that even if the tether 50 is partially cut, the tether 50 is cut off due to such partial cutting can be lowered.

It should be noted that although the strands 61 of the first to sixth cabled yarns 51 to 56 include the piano wires 72, the piano wires may be replaced by tungsten wires or high strength fibers.

Although the strands 61 of the first to sixth cabled yarns 51 to 56 include the aluminum wires 71, other material may be employed.

Surfaces of the aluminum wires 71 and the piano wires 72 may be plated with a material having lower electrical resistance such as copper.

<Application Examples>

The tether according to the above-mentioned embodiment kinks and is automatically deformed upon tension release. However, it is sufficient that the net according to the present invention kinks and is automatically deformed upon tension release. For example the net according to the present invention may kink and be automatically deformed in a coil shape upon tension release, kink and automatically widen the net meshes upon tension release, or kink and automatically turn over the net meshes upon tension release. Such deformation can be achieved by selecting as appropriate the material and the thickness of the single yarns (piano wires), the twist way (balance between final twist and first twist (number of twists per length unit and twist strength), the twist direction (S-twist and Z-twist), and the like).

In the above-mentioned embodiment, the description has been made by exemplifying the space tether, though the net according to the present invention can also be used for applications other than the application as the space tether. The net according to the present invention is used as a fishing net by configuring it to kink and automatically widen the net meshes upon tension release for example. Moreover, by using the net that kinks and is automatically deformed upon tension release as an electric wire or a member added as an auxiliary member for the electric wire, it can be inhibited from interfere with others when the electric wire is cut.

REFERENCE SIGNS LIST 10, 50 tether
11 strand
11a single yarn
11b single yarn
12 cabled yarn
40 tether storing apparatus
42 first winder portion
42a one side
42b other side
43 second winder portion

The invention claimed is:

1. A net that kinks upon tension release by mixing and twisting a first material with a second material having higher torsional rigidity than the first material, wherein the net is automatically deformed upon tension release by kinking
    wherein said net is formed by configuring a plurality of cabled yarns in a net form, the plurality of cabled yarns including a first cabled yarn and a second cabled yarn, the first cabled yarn obtained by finally twisting a plurality of first strands with an S-twist, the plurality of first strands each being a first strand obtained by first twisting a first single yarn and a second single yarn having higher torsional rigidity than the first single yarn with a Z-twist, the second cabled yarn being obtained by finally twisting a plurality of second strands with an S-twist, the plurality of second strands each being a second strand obtained by first twisting the first single yarn and the second single yarn with an S-twist.

2. The net according to claim 1, which is configured by crossing the plurality of cabled yarns in a zigzag form to be knotless such that the first cabled yarn and the second cabled yarn are alternately adjacent to each other.

3. The net according to claim 1, wherein the second single yarn includes a piano wire, a tungsten wire, or a high strength fiber.

4. The net according to claim 1, which is formed by first twisting a plurality of single yarns into a first strand, finally twisting a plurality of first strands each being the first strand into a cabled yarn, and configuring a plurality of cabled yarns each being the cabled yarn in a net form,
    wherein balance between the number of twists per length unit in the first twist and the number of twists per length unit in the final twist is adjusted such that the net is automatically deformed upon tension release.

5. The net according to claim 1, which is configured for use as a space tether.

6. The net according to claim 5, which is electrically conductive.

7. The net according to claim 1, which is configured for use as a fishing net.

8. The net according to claim 1, which is used as an electric net or added to an electric wire as an auxiliary member.

9. A method of using a tether storing apparatus, the tether storing apparatus comprising:
    a first winder portion that winds and stores a first part of a tether lightly twisted upon tension release in accordance with a spool method of deployment from an inside, has one side from which one end of the first part of the tether extends and another side from which another end of the first part of the tether extends, and is capable of deploying the tether to an outside from the one side; and
    a second winder portion that is continuous with the other end of the first part of the tether stored by the first winder portion and winds and stores a second part of the tether tightly twisted upon tension release,
    the method comprising:
        deploying the first part of the tether and the second part of the tether from the tether storing apparatus, first pulling out the first part of the tether wound around the first winder portion;
        after a gravity gradient of the deployed first part of the tether reaches a predetermined value or more, pulling out the second part of the tether wound around the second winder portion to deploy the second part of the tether, wherein the second part of the tether, by mixing and twisting a material having higher torsional rigidity, is tightly twisted, kinks upon tension release, and is automatically deformed upon tension release by kinking; and when the first part of the tether or the second part of the tether is cut or detached from the tether storing apparatus, causing the second part of the tether to kink upon tension release to be automatically deformed.

10. The method according to claim 9, wherein the lightly twisted first part of the tether is not automatically deformed upon tension release.

11. A manufacturing method for a net, comprising:

twisting a first single yarn and a second single yarn having higher torsional rigidity than the first single yarn into a first strand with a Z-twist;

twisting a third single yarn and a fourth single yarn having higher torsional rigidity than the third single yarn into a second strand with a Z-twist, the third single yarn being of a same material as the first single yarn, and the fourth single yarn being of a same material as the second single yarn;

twisting the first strand and the second strand into a first cabled yarn with an S-twist;

twisting a fifth single yarn and a sixth single yarn into a third strand with an S-twist, the fifth single yarn being of the same material as the first single yarn, and the sixth single yarn being of the same material as the second single yarn;

twisting a seventh single yarn and an eighth single yarn into a fourth strand with an S-twist, the seventh single yarn being of the same material as the first single yarn, and the eighth single yarn being of the same material as the second single yarn;

twisting the third strand and the fourth strand into a second cabled yarn with an S-twist;

configuring the first cabled yarn and the second cabled yarn in a net form to be knotless; and adjusting a thickness of some yarns from among the first single yarn, the second single yarn, the third single yarn, the fourth single yarn, the fifth single yarn, the sixth single yarn, the seventh single yarn, and the eighth single yarn, or adjusting balance between a number of twists per length unit in the twist for some cabled yarns from between the first cabled yarn and the second cabled yarn and a number of twists per length unit in the twist for some strands from among the first strand, the second strand, the third strand, and the fourth strand, or selecting as appropriate a twist direction from between an S-twist and a Z-twist, such that the net is automatically deformed into a desired state upon tension release.

* * * * *